United States Patent
Yoshimoto et al.

(10) Patent No.: US 10,596,994 B2
(45) Date of Patent: Mar. 24, 2020

(54) FRONT STRUCTURE OF VEHICLE

(71) Applicant: MAZDA MOTOR CORPORATION, Hiroshima (JP)

(72) Inventors: Hiroyuki Yoshimoto, Hiroshima (JP); Takeshi Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 56 days.

(21) Appl. No.: 15/876,232

(22) Filed: Jan. 22, 2018

(65) Prior Publication Data

US 2018/0236966 A1    Aug. 23, 2018

(30) Foreign Application Priority Data

Feb. 17, 2017  (JP) ................. 2017-027497

(51) Int. Cl.
*B60R 19/52*     (2006.01)
*B60R 21/34*     (2011.01)
*B62D 21/15*     (2006.01)

(52) U.S. Cl.
CPC .............. *B60R 21/34* (2013.01); *B60R 19/52* (2013.01); *B62D 21/152* (2013.01); *B60R 2019/527* (2013.01); *B60R 2021/343* (2013.01)

(58) Field of Classification Search
CPC ... B60R 19/52; A47J 37/0786; A47J 37/0713; B62D 25/084; C08L 23/0815; C08L 2666/02; C08L 2666/06
See application file for complete search history.

(56) References Cited

U.S. PATENT DOCUMENTS

| | | | | |
|---|---|---|---|---|
| 4,406,489 A | * | 9/1983 | Trabert | B60R 19/52 293/115 |
| 4,566,407 A | * | 1/1986 | Peter | B60K 11/08 123/41.48 |
| 4,940,281 A | * | 7/1990 | Komatsu | B60Q 1/05 296/193.09 |
| 6,659,220 B2 | * | 12/2003 | Kobayashi | B60K 11/08 180/68.1 |
| 6,676,179 B2 | * | 1/2004 | Sato | B60R 19/12 293/115 |

(Continued)

FOREIGN PATENT DOCUMENTS

JP    2012-148613 A    8/2012
JP    2014-218113 A    11/2014
(Continued)

*Primary Examiner* — Kiran B Patel
(74) *Attorney, Agent, or Firm* — Studebaker & Brackett PC

(57) ABSTRACT

A grill bracket, a rear end portion of which is fixed to a shroud, is provided below a fascia upper member which is provided in front of a bonnet (engine hood). A front-side portion of the grill bracket is configured as an impact absorbing structure (a rib structure with ribs, for example) which extends forward along a back face of the fascia upper member. A front end portion of the impact absorbing structure is configured to be bent downward. Impact absorption for a relatively-small load which is applied from an upward side is attained by downward-bending deformation of the grill bracket (the front-side portion). Impact absorption for a relatively-large load which is applied from a forward side is attained by a bracing operation as well as downward-bending deformation of the front-side portion.

9 Claims, 10 Drawing Sheets

(56) References Cited

U.S. PATENT DOCUMENTS

| | | | | |
|---|---|---|---|---|
| 7,644,966 B2* | 1/2010 | Huber | ............... | B60Q 1/0433 |
| | | | | 293/155 |
| 9,381,946 B2* | 7/2016 | Clapie | ............... | B62D 25/085 |
| 2014/0252802 A1* | 9/2014 | Lopez | ............... | B60R 21/34 |
| | | | | 296/187.04 |
| 2015/0136512 A1* | 5/2015 | Tashiro | ............... | B60R 21/34 |
| | | | | 180/271 |
| 2015/0274211 A1* | 10/2015 | Riedl | ............... | B62D 25/084 |
| | | | | 296/187.09 |
| 2017/0349124 A1* | 12/2017 | Onishi | ............... | B60R 21/34 |

FOREIGN PATENT DOCUMENTS

| | | |
|---|---|---|
| JP | 2015-027839 A | 2/2015 |
| JP | 2015-136947 A | 7/2015 |

\* cited by examiner

FRONT STRUCTURE OF VEHICLE

BACKGROUND OF THE INVENTION

The present invention relates to a front structure of a vehicle.

It has been recently required for the vehicle to protect both a pedestrian's thigh portion and a pedestrian's head portion. For the protection of the thigh portion, it is necessary that a large collision-absorption stroke is secured so that the thigh portion does not hit against a vehicle body directly at an initial collision stage and the absorbing load becomes large. For the protection of the head portion, meanwhile, it is necessary that the rigidity does not become excessively high because of a small collision-absorption stroke. Herein, a fascia upper member itself does not have the collision-absorption function substantially.

Japanese Patent Laid-Open Publication No. 2015-136947 discloses a structure in which an impact absorbing member is provided below the fascia upper member for compatibly attaining the thigh-portion protection and the head-portion protection of the pedestrian. Specifically, the impact absorbing member comprises an upper face portion, a lower face portion, and a connection portion which connects the upper face portion and the lower face portion. Herein, the connection portion has a lateral rib, a longitudinal rib, and a cutout as a weak portion.

The structure disclosed in the above-described patent document is configured such that the position of a front end of the upper face portion and the position of a front end of the lower face portion is greatly away from each other in a vertical direction. Accordingly, it becomes necessary to make a large layout space for the fascia upper member below the fascia upper member, and also the members become so large and complex as a whole. These things may be inappropriate.

SUMMARY OF THE INVENTION

The present invention has been devised in view of the above-described matters, and its object is to provide a front structure of a vehicle which can properly protect both the thigh portion and the head portion of the pedestrian in a vehicle collision by providing properly simple-and-small members.

The present invention is a front structure of a vehicle which comprises a fascia upper member provided in front of a bonnet, and a grill bracket provided below the fascia upper member, a rear end portion of which is fixed to a shroud, wherein a front-side portion of the grill bracket is configured to extend along a back face of the fascia upper member as an impact absorbing structure, and a front end portion of the impact absorbing structure is configured to be bent downward.

According to the present invention, impact absorption for a relatively-small load which is applied to the fascia upper member from an upward side (a load applied from a head portion of a pedestrian, for example) is attained by downward-bending deformation of the grill bracket. Meanwhile, impact absorption for a relatively-large load which is applied to the fascia upper member from a forward side (a load applied from a thigh portion of the pedestrian, for example) is attained by bracing of the impact absorbing structure as well as the downward-bending deformation of the grill bracket. The grill bracket can be configured to have a narrow width, in the vertical direction, and extend long, in the longitudinal direction, as a whole, thereby providing a properly simple-and-small structure.

In an embodiment of the present invention, a fixation portion of the rear end portion of the grill bracket to the shroud is positioned at a higher level than the front end portion of the impact absorbing structure. According to this embodiment, the grill bracket can be properly bending-deformed downward around its rear end portion.

In another embodiment of the present invention, an upper end of the front end portion of the impact absorbing structure is positioned at a lower level than a lower end of a rear end portion of the impact absorbing structure. According to this embodiment, the grill bracket can be properly bending-deformed downward when receiving the load from the upward side by positioning a front end portion of the grill bracket at a substantially-low level.

In another embodiment of the present invention, a rear portion of the impact absorbing structure is configured as an upward-protrusion portion which protrudes upward, and a rear end portion of the fascia upper member is fixed to the upward-protrusion portion. According to this embodiment, the rear end portion of the fascia upper member and the grill bracket can be firmly fixed properly. Further, the load applied to the fascia upper member (a load from the upward side, especially) can be securely transmitted to the grill bracket properly.

In another embodiment of the present invention, the impact absorbing structure comprises a lateral rib which extends in a vehicle width direction and a longitudinal rib which extends in a longitudinal direction and connects to the lateral rib. According to this embodiment, the impact absorbing structure can be simply formed by a rib structure.

In another embodiment of the present invention, a grill opening portion where a grill member is provided is provided below the fascia upper member, and a lower end of the grill bracket is positioned at a higher level than an upper edge portion of the grill opening portion. According to this embodiment, the width, in the vertical direction, of the grill bracket can be sufficiently small, and also it can be properly avoided that traveling air coming in is blocked by the grill bracket.

Other features, aspects, and advantages of the present invention will become apparent from the following description which refers to the accompanying drawings.

DETAILED DESCRIPTION OF THE INVENTION

Figure 1:
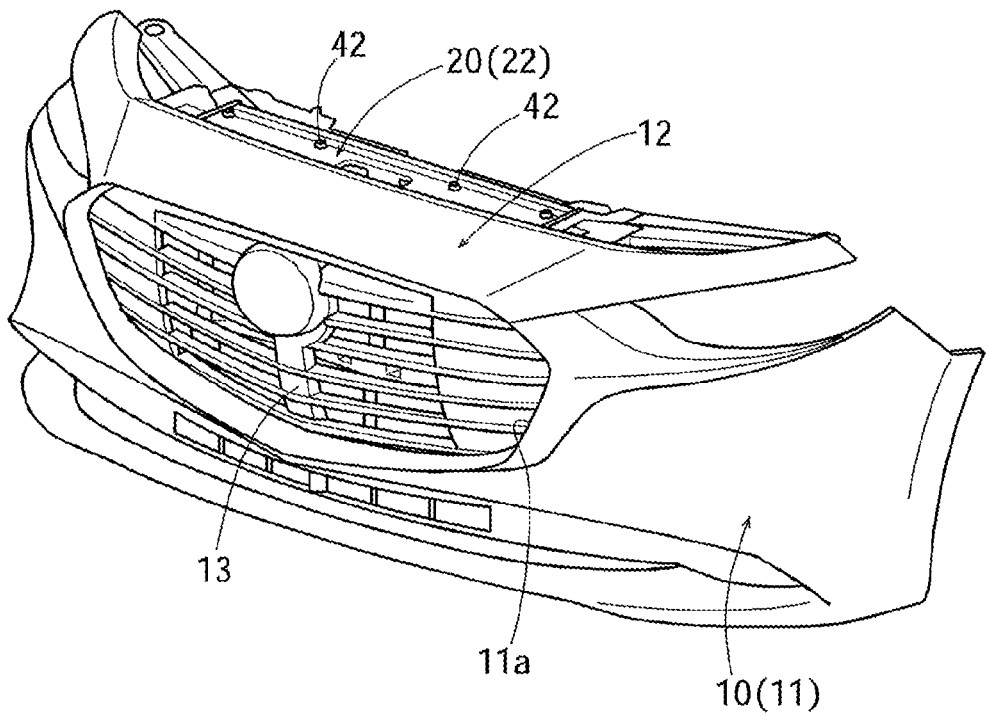
FIG. 1 is a perspective view of a front portion of a vehicle to which the present invention is applied.

A reference character 10 denotes a bumper fascia in FIG. 1. The bumper fascia 10 comprises a fascia lower member 11 and a fascia upper member 12. The fascia lower member 11, which is a large-sized member, has a grill opening portion 11a which opens upward, which is formed at a central portion, in a vehicle width direction, of the fascia lower member 11. A grill member 13 is provided at the grill opening portion 11a. The grill member 13 has many small holes (opening portions) through which traveling air comes in, and the grill member 13 is formed integrally with the fascia lower member 11 by means of fixing tools or the like.

Figure 6:
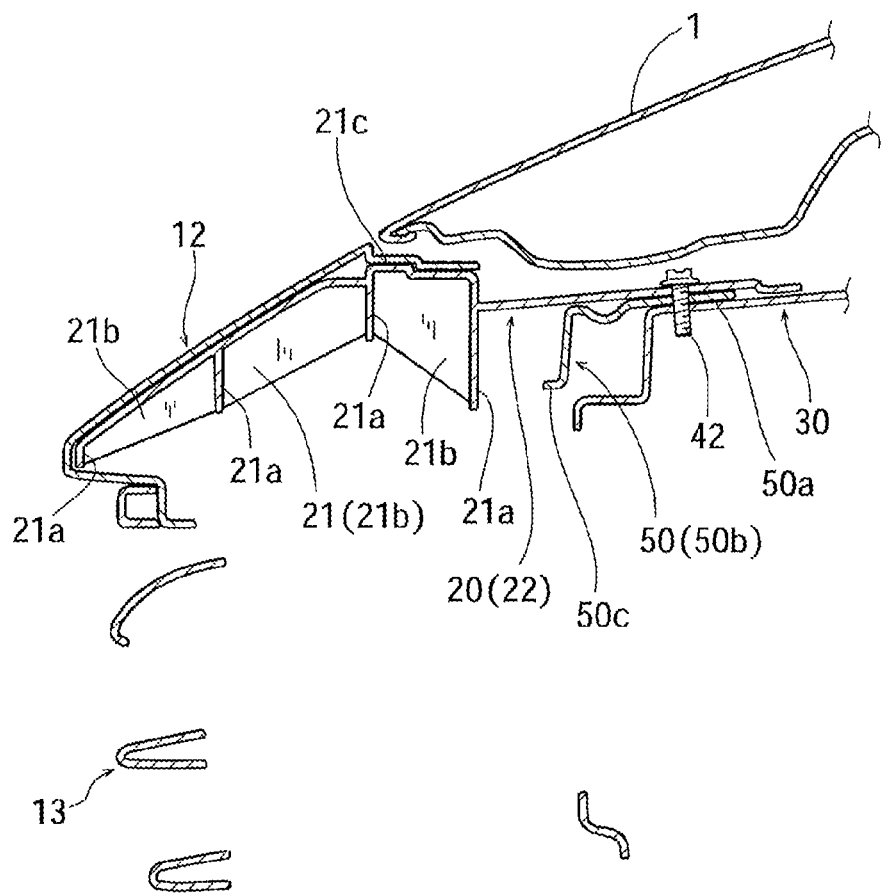
FIG. 6 is a side sectional view of a fixation portion of a rear end portion of the grill bracket and a shroud.
Figure 7:
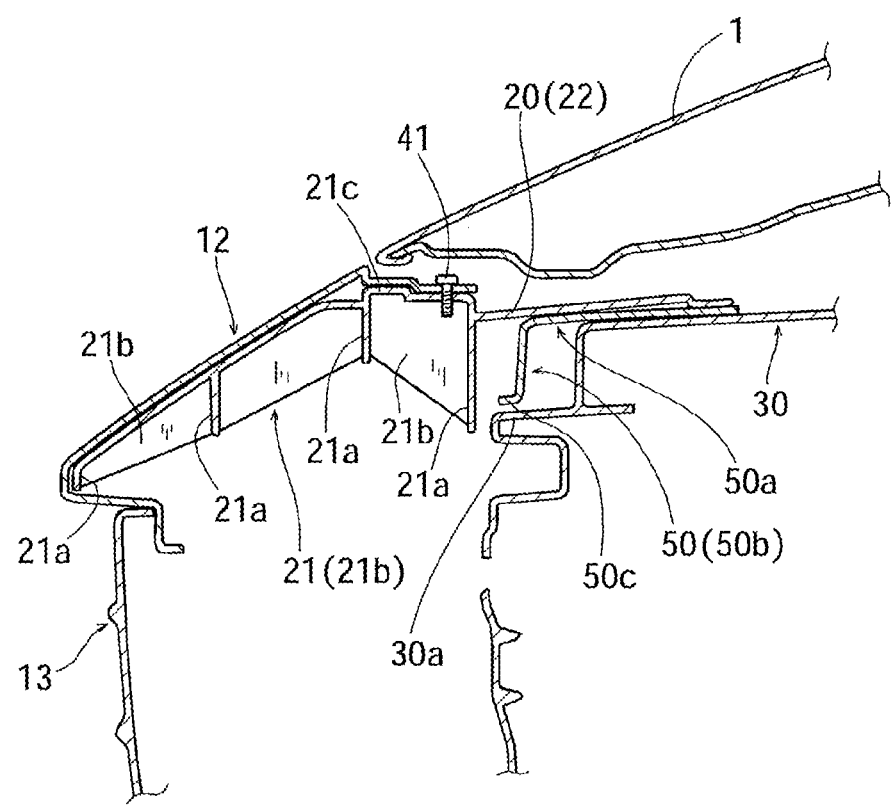
FIG. 7 is a side sectional view of a fixation portion of a fascia upper member to the grill bracket.

The fascia upper member 12 is a smaller member than the fascia lower member 11. The fascia upper member 12 is positioned in front of a bonnet (i.e., an engine hood) 1 which covers over an engine room as shown in FIGS. 6 and 7. The fascia upper member 12 covers over the grill opening portion 11a (the fascia upper member 12 forms an upper edge portion of the grill opening portion 11a). A rear end of the fascia upper member 12 forms a flush surface together with a front end of the bonnet 1.

Figure 2:
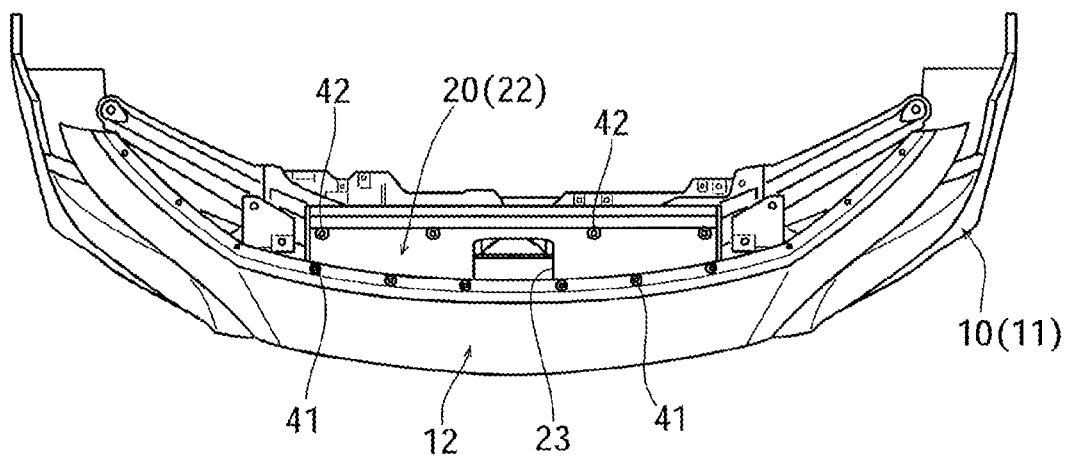
FIG. 2 is a plan view showing a state where a bonnet is removed from a state shown in FIG. 1.
Figure 3:
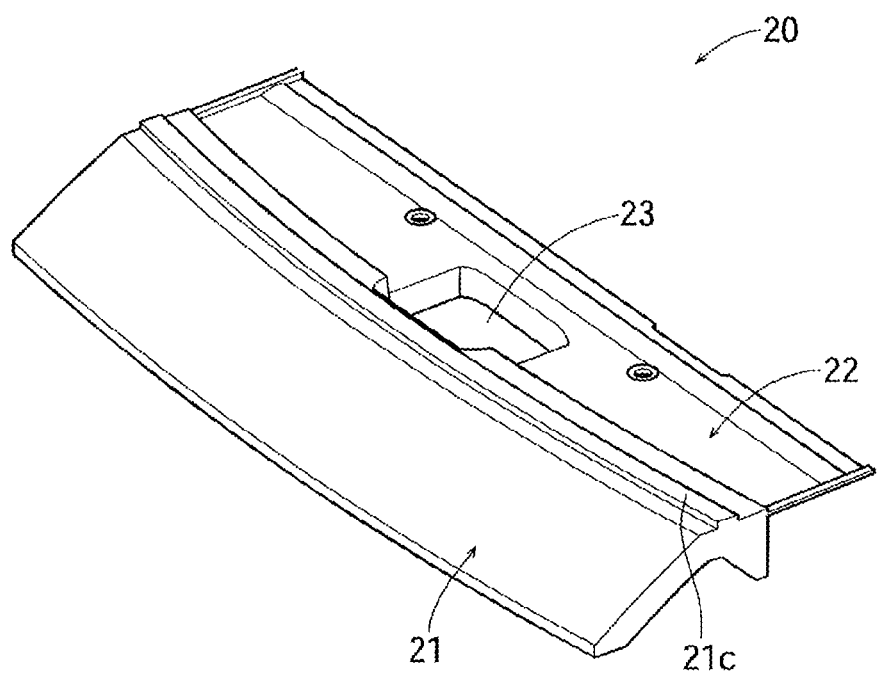
FIG. 3 is an upward perspective view of a grill bracket.
Figure 4:
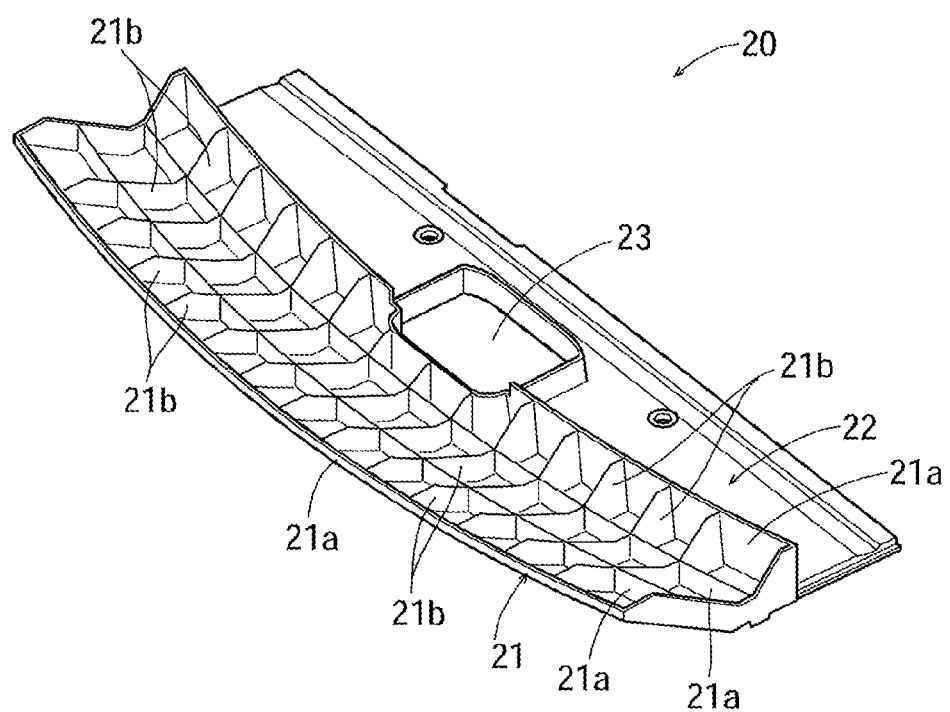
FIG. 4 is a downward perspective view of the grill bracket shown in FIG. 3.

A grill bracket 20 is provided below the bonnet 1 and the fascia upper member 12 as shown in FIGS. 2 and 3. The grill bracket 20 is made of synthetic resin and configured to extend long in the vehicle width direction in the present embodiment.

The grill bracket 20 comprises a front-side portion 21 and a rear-side portion 22. The front-side portion 21 is configured to be a rib structure where ribs protrude on a back-face side, which constitutes an impact absorbing structure. Specifically, there are provided plural lateral ribs 21a which extend in the vehicle width direction, being spaced apart from each other in the longitudinal direction, and plural longitudinal ribs 21b which extend in the longitudinal direction, being spaced apart from each other in the vehicle width direction. The adjacent lateral ribs 21a are interconnected via the longitudinal ribs 21b.

The front-side portion 21, i.e., the impact absorbing structure, is configured to be an upward-protrusion portion 21c which protrudes slightly upward, and a rear end portion of the fascia upper member 12 is fixed to the upward-protrusion portion 21c by fixing tools 41 (see FIG. 7). This front-side portion 21 is provided such that its forward-side portion from the upward-protrusion portion 21c is along a back face of the fascia upper member 12. That is, the fascia upper member 12 is configured such that its forward side becomes gradually low, so that the front-side portion 21 is configured in a bent shape such that its forward side becomes gradually low as well. Further, a front end of the front-side portion 21 extends up to a position close to the front end of the fascia upper member 12. Herein, since the fascia upper member 12 is fixed to the front-side portion 21 of the impact absorbing structure, the fascia upper member 12 can be firmly fixed properly.

An upper end of a front end portion of the front-side portion 21 of the grill bracket 20 is positioned at a lower level than a lower end of a rear end portion of the front-side portion 21 of the grill bracket 20. That is, the front-side portion 21 is configured such that its downward bending becomes sufficiently large (that it is easily bending-deformed downward when receiving the load from the upward side).

The rear-side portion 22 of the grill bracket 20 is configured substantially in a flat-plate shape, and a rear end portion of the rear-side portion 22 is fixed to an upper end portion of a shroud 30 which has a high rigidity by fixing tools 42 (see FIG. 6). A fixation portion of the grill bracket 20 by using the fixing tolls 42 is positioned at a higher level than an upper end of the front end portion 21 of the grill bracket 20, and positioned at a lower level than a fixation portion of the grill bracket 20 by using the fixing tools 41.

Herein, an opening portion 23, through which an anchor member for locking which is provided at a lower face of the front end portion of the bonnet 1 passes, is formed at a central portion, in the vehicle width direction, of the grill bracket 20. The grill bracket 20 is formed as an integral molded article. Further, while the lower end of the front end portion of the grill bracket 20 is positioned at the lowermost level, the level of the lower end of the grill bracket 20 is the same as or higher than the upper edge portion of the grill opening portion 11a. That is, the grill bracket 20 is configured such that its longitudinal-direction length is long but its vertical-direction height is low.

Figure 5:
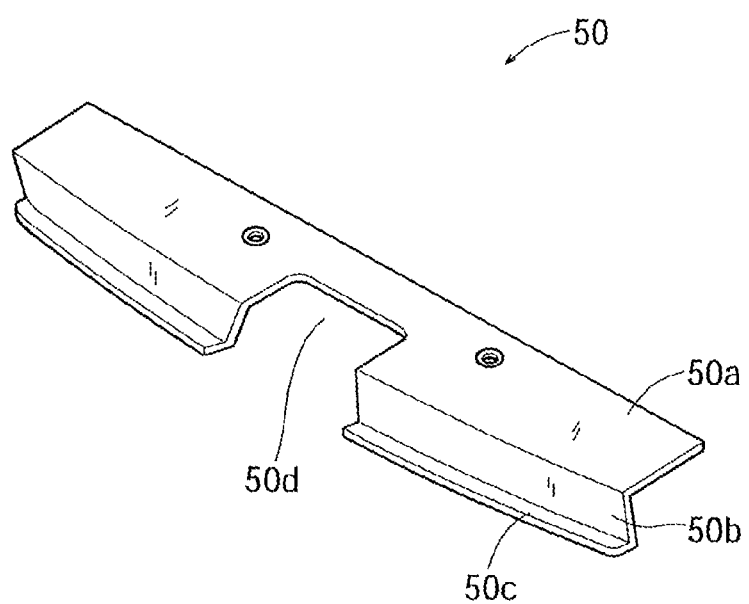
FIG. 5 is an upward perspective view of a forward-extending member.

A forward-extending member 50 which is shown in FIG. 5 is provided right below the rear-side portion 22 of the grill bracket 20. This forward-extending member 50 is made of synthetic resin or a metal plate, for example.

The forward-extending member 50 comprises a rear portion 50a which extends in the longitudinal direction and is of a roughly flat-plate shape, a vertical wall portion 50b which extends downward from a front end of the rear portion 50a, and a forward-bending portion 50c which extends slightly forward from a lower end of the vertical wall portion 50b. A rear end portion of the rear portion 50a is fixed to the shroud 30 together with the rear-side portion 22 of the grill bracket 20 by the fixing tools 42.

The vertical wall portion 50b of the forward-extending member 50 is positioned such that it faces a rear end face of the front-side portion 21 (the impact absorbing structure) of the grail bracket 20. A forward-protrusion portion 30a (see FIG. 7) which is provided at the shroud 30 is positioned right below the forward-bending portion 50c (the vertical wall portion 50b). Thereby, the downward deformation of the rear-side portion 22 is suppressed by the shroud 30 via the forward-extending member 50 as well. Herein, an opening portion 50d, through which the anchor member for locking which is provided at the lower face of the front end portion of the bonnet 1 passes, is formed at a central portion, in the vehicle width direction, of the forward-extending member 50.

The grill bracket 20 extending in the longitudinal direction is supported by the shroud 30 in a cantilever manner as a whole, so that the grill bracket 20 is configured to be easily deformed downward. The forward-extending member 50 is configured to serve as a reinforcing member to support the rear-side portion 22 of the grill bracket 20 from below.

The front-side portion 21 of the grill bracket 20, i.e., the impact absorbing structure, is configured to be easily bending-deformed downward but not to be easily crushable in the longitudinal direction. The impact absorption of a load applied from the forward side in a vehicle frontal collision by means of the grill bracket 20 is mainly attained by crushing deformation of the lateral ribs 21a and the longitudinal ribs 21b and the downward-bending deformation of the front-side portion 21 of the grill bracket 20.

Herein, a load applied from a thigh portion of a pedestrian is inputted to the front end portion of the fascia upper member 12 and this load becomes a rearward load. Meanwhile, a load applied from a head portion of the pedestrian is inputted to the rear end portion of the fascia upper member 12 from an obliquely-upward side, which is considerably different form the above-described load applied from the thigh portion in an input position or an input direction. The load inputted to the rear end portion of the fascia upper member 12 is absorbed effectively. Accordingly, the front-side portion 21 as the impact absorbing structure is configured to extend up to a position located in back of the fixing tools 41a which fix the rear end portion of the fascia upper member 12. Also, the downward-protrusion length of the lateral ribs 21a, 21b is configured such that its rear side is longer than its front side.

Herein, the impact load applied from the pedestrian's head portion is inputted to the fascia upper member 12 from an oblique side such that it is directed obliquely downward and rearward. The lateral ribs 21a and the longitudinal ribs 21b do not produce a great resisting force against an impact including the above-described downward load, so that the front-side portion 21 of the grill bracket 20 is bending-deformed downward in particular, thereby absorbing the impact properly.

Meanwhile, the impact load applied from the pedestrian's thigh portion is inputted to the fascia upper member 12 such that it is directed substantially rearward. In this case of the impact from the thigh portion, the crushing deformation of the ribs 21a, 21b of the grill bracket 20 and the downward-bending deformation of the front-side portion 21 of the grill bracket 20 operate so as to attain the great impact absorption (the impact absorption with a large stroke and a magnitude which is roughly proportional to the impact load).

Herein, since the fixing tolls 41, 42 are positioned at the higher level than the upper end of the front end portion of the grill bracket 20, the grill bracket 20 (the front-side portion 21, particularly) is easily deformed downward.

Since the grill bracket 20 extends forward considerably long beyond its fixation portion to the shroud 30 (the position of the fixing tools 42), there is a possibility that the grill bracket 20 is deformed downward so much that the grill bracket 20 may get broken at the rear-side portion 22. However, the grill bracket 20 is supported by the forward-extending member 50, so that a situation where the grill bracket 20 gets broken improperly is securely avoided (a proof load of the rear portion of the grill bracket 20 is increased).

The rearward load inputted to the grill bracket 20 can be received by the forward-extending member 50. Further, when the load applied from the oblique upward side is inputted to the grill bracket 20, it is promoted by the forward-extending member 50 that the downward-bending deformation of the grill bracket 20 is attained by the front-side portion 21 of the impact absorbing structure.

Figure 8:
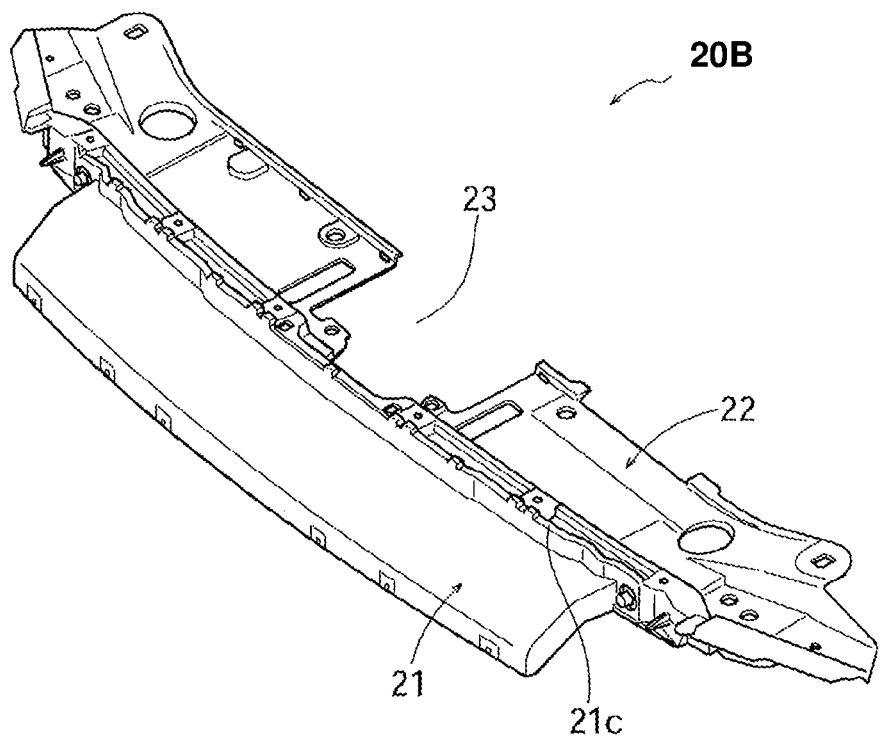
FIG. 8 is an upward perspective view of a grill bracket according to a second embodiment of the present invention.
Figure 9:
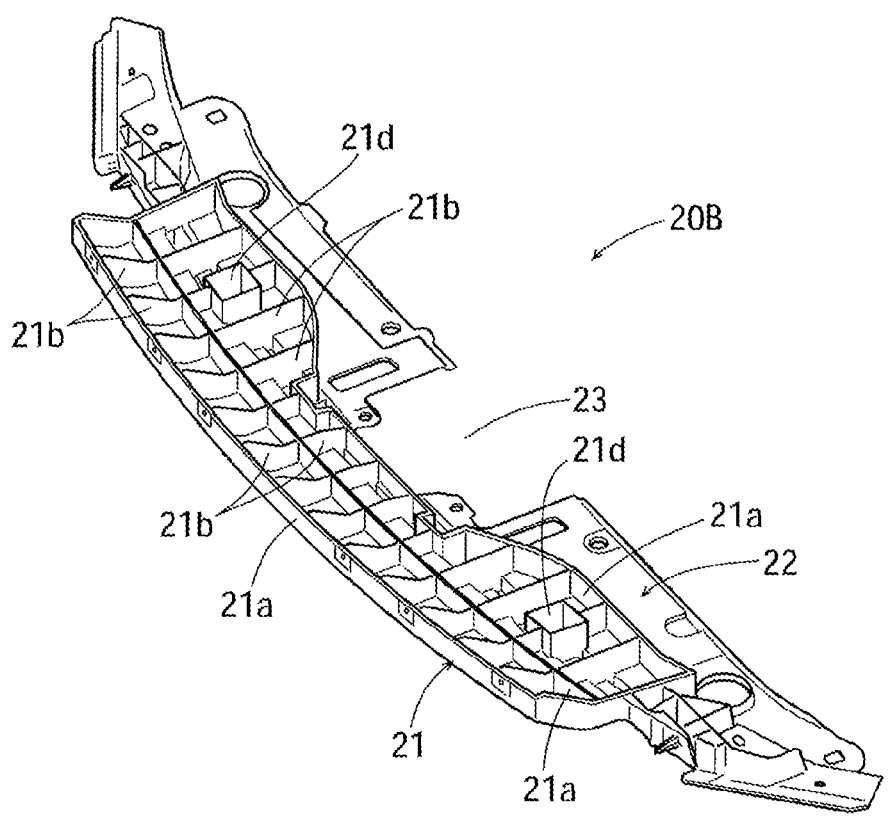
FIG. 9 is a downward perspective view of the grill bracket shown in FIG. 8.
Figure 10:
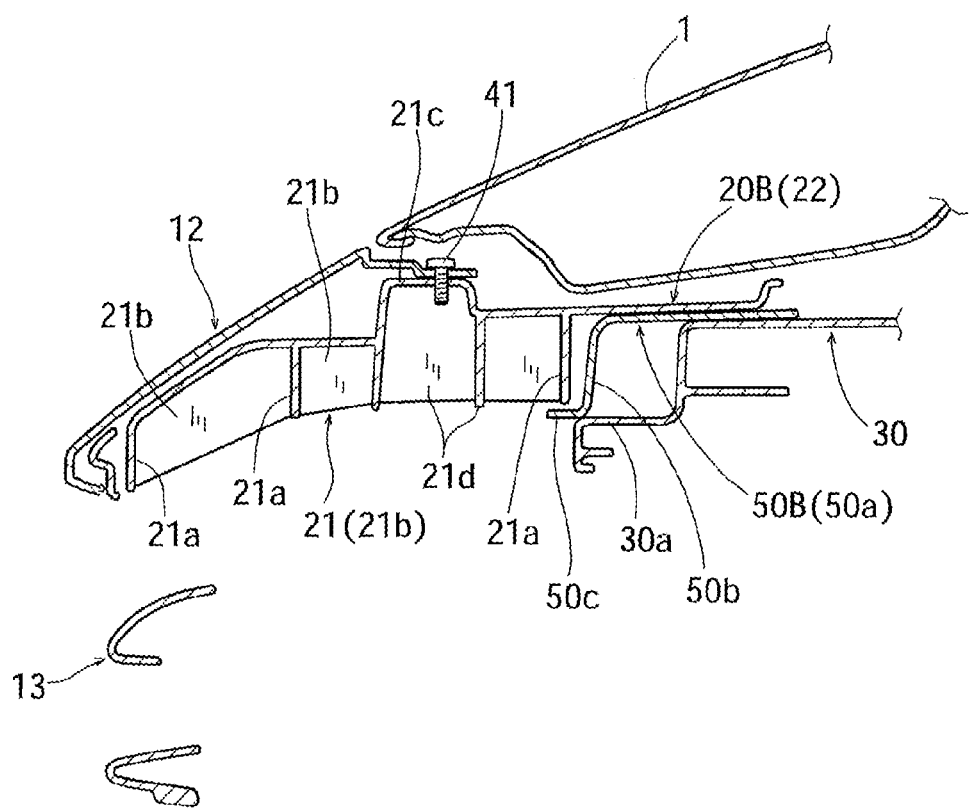
FIG. 10 is a side sectional view of the grill bracket shown in FIG. 8, which corresponds to FIG. 7.

FIGS. 8-10 show a second embodiment of the present invention. The same structures/elements as the above-described embodiment are denoted by the same reference characters, duplicated descriptions of which are omitted here.

In the second embodiment, a box-shaped rib portion 21d which is substantially of a square shape is formed at a central portion, in the longitudinal direction, of part of the longitudinal ribs 21b (for improving the rigidity partially) as a rib structure which is formed at the back-face side of a grill bracket 20B (corresponding to the grill bracket 20). The position which corresponds to the box-shaped rib portion 21d is set to be the upward-protrusion portion 21c where the fixation by means of the fixing tool 41 is attained.

In the second embodiment, the rear-side portion 22 of the grill bracket 20B is configured to be longer outward, compared to the above-described embodiment, and the opening portion 23 is configured to have a cutout shape which opens rearward.

Further, in the second embodiment, a forward-extending member 50B (which corresponds to the forward-extending member 50 of the above-described embodiment) is configured to extend forward further, compared to the above-described embodiment so that the rear end portion of the front-side portion 21 as the rib structure is supported by the forward-bending portion 50c as well. Moreover, a lower face of the forward-bending portion 50c (a lower end of the vertical wall portion 50b) is configured to be close to or contact an upper face of the forward-protrusion portion 30a of the shroud 30. Thereby, when the grill bracket 20B is bending-deformed downward, the grill bracket 20B can be securely supported by the forward-extension portion 30a.

Additionally, in the second embodiment, the upward-protrusion portion 21c of the grill bracket 20B, to which the rear end portion of the fascia upper member 12 is fixed, is positioned at a higher level, compared to the case of the above-described embodiment. Thereby, a relatively large pace, in the vertical direction, is secured right in front of the upward-protrusion portion 21c above the rear end portion of the fascia upper member 12 so that the impact applied from the pedestrian's head portion is received by the front end portion of the front-side portion 21 properly.

The present invention should not be limited to the above-described embodiments and any other modifications or improvements may be applied within the scope of a spirit of the present invention. The fascia lower member 11 and the fascia upper member 12 may be formed as an integral molded article as seen in a sports car, for example. The forward-extending member 50 may be omitted alternatively.

What is claimed is:

1. A front structure of a vehicle, comprising:
  a fascia upper member provided in front of a bonnet; and
  a grill bracket provided below the fascia upper member, a rear end portion of which is fixed to a shroud;
  wherein a front-side portion of said grill bracket is configured to extend along a back face of said fascia upper member, and a front end portion of said front-side portion of said grill bracket is configured to be bent downward,
  a fixation portion of said rear end portion of said grill bracket to said shroud is positioned at a higher level than said front end portion of said front-side portion of said grill bracket,
  a rear portion of said front-side portion of said grill bracket is configured as an upward-protrusion portion which protrudes upward, and a rear end portion of said fascia upper member is fixed to said upward-protrusion portion, and
  a lower end of said rear end portion of said grill bracket is located at a lower level than a fixation part where said rear end portion of said grill bracket is fixed onto an upper face of said shroud, the lower end of said rear end portion of said grill bracket being in front of the fixation part.

2. The front structure of the vehicle of claim 1, an upper end of the front end portion of said front-side portion of said grill bracket is positioned at a lower level than a lower end of a rear end portion of said front-side portion of said grill bracket.

3. The front structure of the vehicle of claim 1, said front-side portion of said grill bracket comprises a lateral rib which extends in a vehicle width direction and a longitudinal rib which extends in a longitudinal direction and connects to the lateral rib.

4. The front structure of the vehicle of claim 2, said front-side portion of said grill bracket comprises a lateral rib which extends in a vehicle width direction and a longitudinal rib which extends in a longitudinal direction and connects to the lateral rib.

5. The front structure of the vehicle of claim 1, a grill opening portion where a grill member is provided is provided below said fascia upper member, and a lower end of said grill bracket is positioned at a higher level than an upper edge portion of said grill opening portion.

6. The front structure of the vehicle of claim 2, a grill opening portion where a grill member is provided is provided below said fascia upper member, and a lower end of said grill bracket is positioned at a higher level than an upper edge portion of said grill opening portion.

7. The front structure of the vehicle of claim 3, a grill opening portion where a grill member is provided is provided below said fascia upper member, and a lower end of said grill bracket is positioned at a higher level than an upper edge portion of said grill opening portion.

8. A front structure of a vehicle, comprising:
a fascia upper member provided in front of a bonnet; and
a grill bracket provided below the fascia upper member, a rear end portion of which is fixed to a shroud;
wherein a front-side portion of said grill bracket is configured to extend along a back face of said fascia upper member, and a front end portion of said front-side portion of said grill bracket is configured to be bent downward,
a fixation portion of said rear end portion of said grill bracket to said shroud is positioned at a higher level than said front end portion of said front-side portion of said grill bracket,
a rear portion of said front-side portion of said grill bracket is configured as an upward-protrusion portion which protrudes upward, and a rear end portion of said fascia upper member is fixed to said upward-protrusion portion, and
said shroud is positioned such that said shroud faces a rear end face of said rear end portion of said front-side portion of said grill bracket in a vehicle longitudinal direction.

9. A front structure of a vehicle, comprising:
a fascia upper member provided in front of a bonnet; and
a grill bracket provided below the fascia upper member, a rear end portion of which is fixed to a shroud;
wherein a front-side portion of said grill bracket is configured to extend along a back face of said fascia upper member, and a front end portion of said front-side portion of said grill bracket is configured to be bent downward,
a fixation portion of said rear end portion of said grill bracket to said shroud is positioned at a higher level than said front end portion of said front-side portion of said grill bracket,
a rear portion of said front-side portion of said grill bracket is configured as an upward-protrusion portion which protrudes upward, and a rear end portion of said fascia upper member is fixed to said upward-protrusion portion, and
a forward-extending member is provided right below a rear-side portion of said grill bracket, said forward-extending member comprising a rear portion which extends in a longitudinal direction and is of a roughly flat-plate shape, a vertical wall portion which extends downward from a front end of the rear portion which extends in the longitudinal direction, said vertical wall portion of said forward-extending member is positioned such that said vertical wall portion of said forward-extending member faces a rear end face of said front-side portion of said grill bracket.

* * * * *